(12) United States Patent
Kagawa et al.

(10) Patent No.: US 9,806,512 B2
(45) Date of Patent: Oct. 31, 2017

(54) PROTECTIVE DEVICE FOR LC FILTER

(71) Applicant: KABUSHIKI KAISHA TOYOTA JIDOSHOKKI, Kariya-shi, Aichi-ken (JP)

(72) Inventors: Fumihiro Kagawa, Kariya (JP); Hiroshi Fukasaku, Kariya (JP); Kazuki Najima, Kariya (JP); Yoshiki Nagata, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 486 days.

(21) Appl. No.: 13/975,571

(22) Filed: Aug. 26, 2013

(65) Prior Publication Data

US 2014/0063673 A1    Mar. 6, 2014

(30) Foreign Application Priority Data

Aug. 29, 2012   (JP) ................................ 2012-188796

(51) Int. Cl.

| H02H 1/00 | (2006.01) |
|---|---|
| H02H 9/00 | (2006.01) |
| H04B 15/00 | (2006.01) |
| B60W 10/30 | (2006.01) |

(52) U.S. Cl.
CPC .......... *H02H 1/0061* (2013.01); *B60W 10/30* (2013.01); *H02H 9/007* (2013.01); *H04B 15/005* (2013.01)

(58) Field of Classification Search
CPC ..................................................... H02H 9/007

USPC .................................................. 307/9.1, 10.1
See application file for complete search history.

(56) References Cited

U.S. PATENT DOCUMENTS

| 3,859,542 A | * | 1/1975 | Kennedy | H02J 3/1828 |
|---|---|---|---|---|
| | | | | 307/105 |
| 4,027,225 A | * | 5/1977 | Elvin | H02M 3/135 |
| | | | | 323/351 |
| 4,282,719 A | * | 8/1981 | Kountz | F25B 49/022 |
| | | | | 62/115 |
| 4,937,719 A | * | 6/1990 | Yamada | H02M 1/14 |
| | | | | 333/181 |
| 5,541,558 A | * | 7/1996 | Weber | H03H 7/1775 |
| | | | | 333/174 |

(Continued)

FOREIGN PATENT DOCUMENTS

| EP | 2413450 A2 | 2/2012 |
|---|---|---|
| JP | 56-110438 A | 9/1981 |

(Continued)

*Primary Examiner* — Adi Amrany
(74) *Attorney, Agent, or Firm* — Sughrue Mion, PLLC

(57) ABSTRACT

A protective device protects an LC filter in a vehicle. The vehicle includes a first vehicle-mounted electric device and a second vehicle-mounted electric device. The first vehicle-mounted electric device includes a first power converter. The second vehicle-mounted electric device includes a second power converter and shares a power supply with the first vehicle-mounted electric device. The LC filter is arranged between the first power converter and the power supply. The LC filter is configured such that the resonance frequency band of the LC filter can be changed. The resonance frequency band of the LC filter is changed based on a ripple amount in a current flowing in the LC filter.

8 Claims, 6 Drawing Sheets

(56) References Cited

U.S. PATENT DOCUMENTS

| | | | |
|---|---|---|---|
| 6,583,519 B2* | 6/2003 | Aberle | B60L 11/1851 307/10.1 |
| 7,084,601 B2* | 8/2006 | Maeda | G01R 1/203 318/803 |
| 8,508,067 B2* | 8/2013 | Song | B60W 20/50 307/10.1 |
| 9,126,485 B2* | 9/2015 | Sakai | B60L 1/003 |
| 9,190,831 B2* | 11/2015 | Mitsutani | B60L 3/0038 |
| 2003/0081440 A1* | 5/2003 | Komatsu | B60L 3/0023 363/132 |
| 2004/0042238 A1* | 3/2004 | Cincinelli | H02M 3/156 363/34 |
| 2006/0113952 A1* | 6/2006 | Zhou | H02P 6/181 318/801 |
| 2006/0224360 A1* | 10/2006 | Kishimoto | B60L 3/0023 702/183 |
| 2008/0211153 A1* | 9/2008 | Sekiya | B60G 13/08 267/140.14 |
| 2008/0247115 A1* | 10/2008 | Lee | H01L 27/016 361/277 |
| 2008/0298785 A1 | 12/2008 | Patel et al. | |
| 2009/0066277 A1 | 3/2009 | Ang et al. | |
| 2010/0006360 A1* | 1/2010 | Kishimoto | B60K 6/365 180/65.285 |
| 2010/0085000 A1* | 4/2010 | Todd | F25B 49/025 318/400.2 |
| 2010/0237821 A1* | 9/2010 | Kitanaka | H02P 21/05 318/702 |
| 2010/0271122 A1* | 10/2010 | Masuda | H03G 3/3052 330/144 |
| 2011/0043150 A1* | 2/2011 | Ogawa | H02M 5/458 318/400.26 |
| 2011/0109155 A1 | 5/2011 | Anwar et al. | |
| 2011/0121798 A1* | 5/2011 | Kitanaka | H02M 3/156 323/266 |
| 2011/0156672 A1* | 6/2011 | Gakhar | G05F 1/565 323/280 |
| 2011/0193532 A1* | 8/2011 | Iwanaga | B60K 6/445 320/163 |
| 2011/0291501 A1 | 12/2011 | Watanabe et al. | |
| 2012/0007425 A1 | 1/2012 | Rozman et al. | |
| 2012/0055727 A1* | 3/2012 | Omiya | B60K 6/445 180/279 |
| 2012/0126764 A1* | 5/2012 | Urakabe | H02M 3/158 323/282 |
| 2012/0292985 A1* | 11/2012 | Sakai | B60L 1/003 307/9.1 |
| 2013/0050890 A1* | 2/2013 | Rozman | H03K 17/082 361/90 |
| 2013/0113279 A1* | 5/2013 | Hatanaka | B60L 9/22 307/9.1 |
| 2013/0249485 A1* | 9/2013 | Bohm | B60L 11/1811 320/109 |
| 2013/0293047 A1* | 11/2013 | Nagasaka | F04B 35/04 310/72 |
| 2014/0063673 A1* | 3/2014 | Kagawa | H02H 9/007 361/113 |
| 2014/0328091 A1* | 11/2014 | Sakakibara | H02M 5/458 363/37 |
| 2015/0155804 A1* | 6/2015 | Sakai | H02P 27/085 318/400.27 |

FOREIGN PATENT DOCUMENTS

| | | |
|---|---|---|
| JP | 63-20213 U | 7/1986 |
| JP | 62-104578 U | 7/1987 |
| JP | 7-123785 A | 5/1995 |
| JP | 2001-111373 A | 4/2001 |
| JP | 2004-032938 A | 1/2004 |
| JP | 2004-104976 A | 4/2004 |
| JP | 2004-236395 A | 8/2004 |
| JP | 2011-032893 A | 2/2011 |
| JP | 2012-157171 A | 8/2012 |

\* cited by examiner

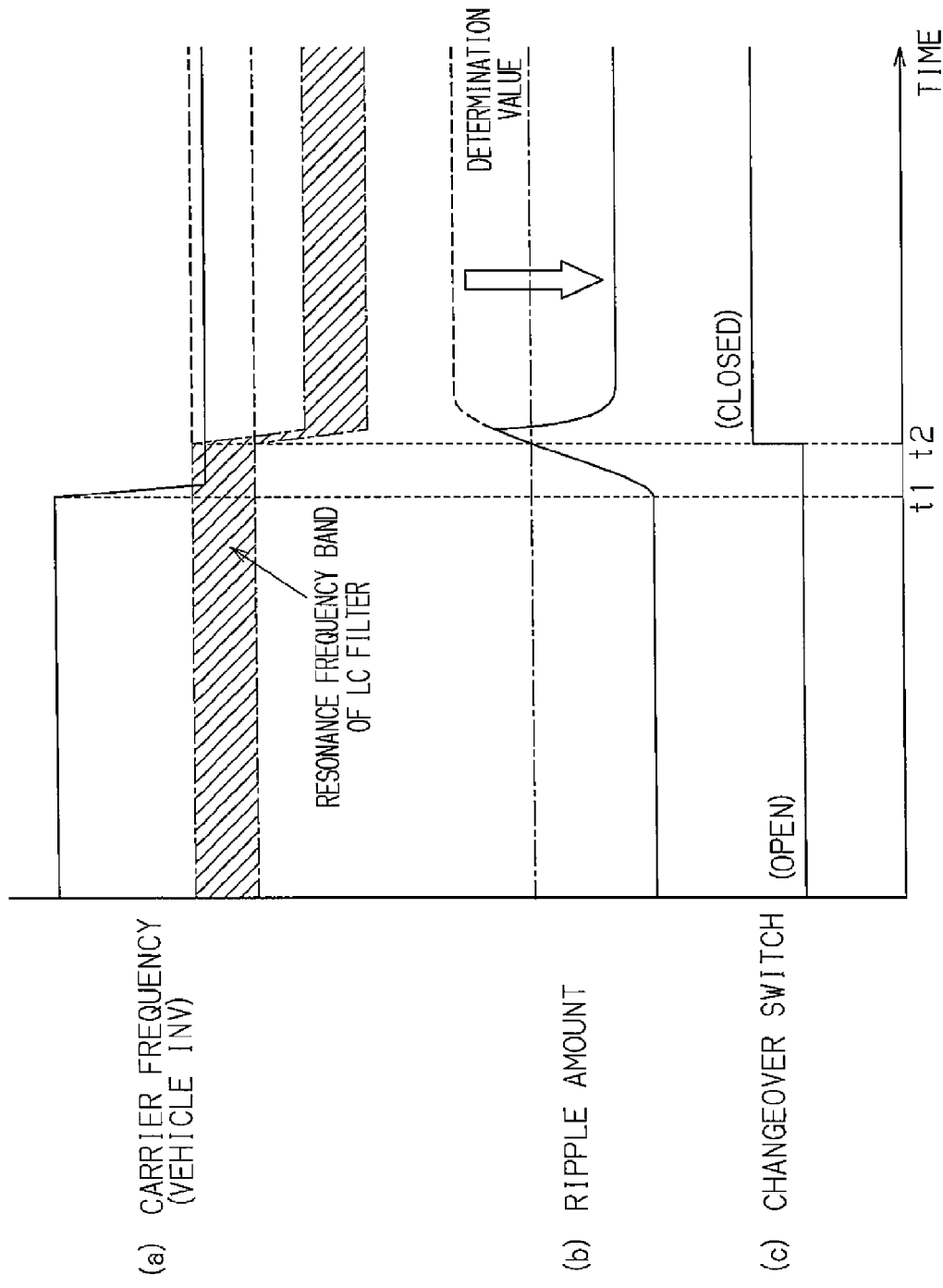

PROTECTIVE DEVICE FOR LC FILTER

BACKGROUND

This disclosure relates to a protective device for an LC filter used in a vehicle-mounted electric device.

Known compressors provided for air conditioners mounted on vehicles such as electric automobiles and hybrid vehicles to compress refrigerant include a motor-driven compressor driven by an electric motor. Such a motor-driven compressor includes an inverter (hereinafter, referred to as an A/C inverter) that controls power supply of the electric motor, and an LC filter. The LC filter composed of a combination of a coil and a capacitor functions as a band-pass filter, and is used to remove noise from power supply of the A/C inverter.

In this motor-driven compressor, once the carrier frequency of the A/C inverter falls within the resonance frequency band of the LC filter, electric resonance is generated in a closed circuit passing through the A/C inverter and the capacitor of the LC filter. Generation of such electric resonance increases a ripple current flowing in the capacitor of the LC filter. Hence, if the LC filter is to be used in a condition where such electric resonance is likely to occur, an element of the LC filter such as the capacitor is required to have a considerably high withstand current.

Japanese Laid-Open Patent Publication No. 56-110438 proposes a protective device for an LC filter located between an inverter and a power supply. This protective device changes the LC value of the LC filter in accordance with the carrier frequency of the inverter, thereby avoiding generation of electric resonance due to interference with the carrier of the inverter. As another example, Japanese Examined Utility Model Publication Nos. 62-104578 and 63-020213, and Japanese Laid-Open Patent Publication No. 2001-111373 propose an LC filter capable of changing the resonance frequency band of the LC filter itself by changing an LC value.

If the aforementioned motor-driven compressor receives power from a power supply common to a traction motor for a vehicle, the carrier of an inverter to control drive power for the traction motor (hereinafter, referred to as a vehicle inverter) used in determining the switching pattern of a switching element may be superimposed on power supplied to the motor-driven compressor. If an $n^{th}$ component (n is an integer of one or more) of the frequency of this carrier approaches the resonance frequency band of the LC filter, a ripple current in the LC filter is increased.

Thus, the carrier frequency of a different vehicle-mounted electric device that shares a power supply with the motor-driven compressor should also be considered in determining the resonance frequency band of the LC filter in the motor-driven compressor. Meanwhile, the electrical specifications of a vehicle-mounted electric device differ depending on a vehicle type, so that the resonance frequency band should be determined individually in accordance with the type of a vehicle to which the motor-driven compressor is to be mounted.

This problem is likely to occur not only in a motor-driven compressor but also in any vehicle-mounted electric device that receives power from a power supply common to a different vehicle-mounted electric device having a power converter that converts the voltage or frequency of power from the power supply.

SUMMARY

It is an objective of the present disclosure to provide a protective device that is capable of in a favorable manner protecting an LC filter provided in a vehicle-mounted electric device from electric resonance generated under the influence of a different vehicle-mounted electric device that shares a power supply with the first vehicle-mounted electric device.

In accordance with one aspect of the present disclosure, a protective device for an LC filter is provided. The protective device protects an LC filter in a vehicle. The vehicle includes a first vehicle-mounted electric device and a second vehicle-mounted electric device. The first vehicle-mounted electric device includes a first power converter. The second vehicle-mounted electric device includes a second power converter and shares a power supply with the first vehicle-mounted electric device. The LC filter is arranged between the first power converter and the power supply. The LC filter is configured such that a resonance frequency band of the LC filter can be changed. The protective device is configured to change the resonance frequency band of the LC filter based on a ripple amount in a current flowing in the LC filter.

According to this form, if a carrier frequency of the second power converter in the second vehicle-mounted electric device approaches the current value of the resonance frequency band of the LC filter to increase the ripple amount in the current flowing in the LC filter, the resonance frequency band of the LC filter is changed. This makes the resonance frequency band of the LC filter deviate from the carrier frequency of the second power converter in the second vehicle-mounted electric device, thereby suppressing increase of the ripple amount.

In accordance with a form of the present disclosure, the protective device is configured to change a carrier frequency of the first power converter in the first vehicle-mounted electric device based on the ripple amount. According to this aspect, if the resonance frequency band of the LC filter is changed to become close to a carrier frequency of a power converter in the same vehicle-mounted electric device, this carrier frequency is changed. This favorably avoids generation of electric resonance due to self-interference as a result of change of the resonance frequency band.

In accordance with a form of the present disclosure, the protective device is configured to change an equivalent series resistance of a capacitor element of the LC filter based on the ripple amount. This aspect favorably suppresses increase of a ripple current flowing in a capacitor of the LC filter.

In accordance with a form of the present disclosure, the protective device is configured to change a carrier frequency of the first power converter in the first vehicle-mounted electric device if the resonance frequency band of the LC filter is changed based on the ripple amount and the resonance frequency band of the LC filter after the change is close to the carrier frequency of the first power converter. This aspect can favorably avoid generation of electric resonance in the first vehicle-mounted electric device due to self-interference therein.

In accordance with another aspect of the present disclosure, a protective device for an LC filter is provided. The protective device protects an LC filter in a vehicle. The vehicle includes a first vehicle-mounted electric device and a second vehicle-mounted electric device. The first vehicle-mounted electric device includes a first power converter. The second vehicle-mounted electric device includes a second power converter and shares a power supply with the first vehicle-mounted electric device. The LC filter is arranged between the first power converter and the power supply. The LC filter is configured such that a resonance frequency band of the LC filter can be changed. The protective device is configured to change the resonance frequency band of the LC filter in accordance with a carrier frequency of the second power converter in the second vehicle-mounted electric device. According to this aspect, if the carrier frequency of the second power converter in the second vehicle-mounted electric device approaches the current value of the resonance frequency band of the LC filter, the resonance frequency band of the LC filter is changed to avoid electric resonance due to interference by this carrier frequency.

In accordance with a form of the present disclosure, the protective device is configured to obtain the carrier frequency of the second power converter in the second vehicle-mounted electric device by means of communication of carrier frequency information from the second vehicle-mounted electric device.

In accordance with a form of the present disclosure, the protective device is configured to obtain the carrier frequency of the second power converter in the second vehicle-mounted electric device by referring to a ripple amount in a current flowing in the LC filter. These aspects can favorably avoid generation of electric resonance in the first vehicle-mounted electric device due to self-interference therein to occur as a result of change of the resonance frequency band.

In accordance with a form of the present disclosure, the protective device is configured to change a carrier frequency of the first power converter in the first vehicle-mounted electric device in accordance with the carrier frequency of the second power converter in the second vehicle-mounted electric device. This aspect can favorably avoid generation of electric resonance in the first vehicle-mounted electric device due to self-interference therein to occur as a result of change of the resonance frequency band.

In accordance with a form of the present disclosure, the protective device is configured to change an equivalent series resistance of a capacitor element of the LC filter in accordance with the carrier frequency of the second power converter in the second vehicle-mounted electric device. This aspect can favorably suppress increase of a ripple current flowing in a capacitor element of the LC filter.

In accordance with a form of the present disclosure, the protective device is configured to change the resonance frequency band by changing at least one of a capacitance of a capacitor element of the LC filter and an inductance of a coil element of the LC filter.

In accordance with a form of the present disclosure, the protective device is configured to change a carrier frequency of the first power converter in the first vehicle-mounted electric device if the resonance frequency band of the LC filter is changed in accordance with the carrier frequency of the second power converter and the resonance frequency band of the LC filter after the change is close to the carrier frequency of the first power converter. This aspect can favorably avoid generation of electric resonance in the first vehicle-mounted electric device due to self-interference therein.

In accordance with a form of the present disclosure, the first vehicle-mounted electric device is a motor-driven compressor and the second vehicle-mounted electric device is a traction motor.

Other aspects and advantages of the discloser will become apparent from the following description, taken in conjunction with the accompanying drawings, illustrating by way of example the principles of the disclosure.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

FIG. 4 is a time chart showing changes of the following parts (a) to (c) according to an example of control by the protective device of FIG. 1, where part (a) shows carrier frequency of a vehicle inverter, part (b) shows ripple amount in a current flowing in an LC filter, and part (c) shows condition of a changeover switch;

FIG. 5($b$) is a graph showing the gain characteristics of the LC filter after the carrier frequency of the vehicle inverter is changed according to an example of the control by the protective device of FIG. 1;

DESCRIPTION OF THE PREFERRED EMBODIMENTS

First Embodiment

A protective device for an LC filter according to a first embodiment of the present disclosure will be described below by referring to FIGS. 1 to 5($b$). The protective device of the first embodiment is applied to an LC filter provided in a motor-driven compressor for use in vehicles.

Figure 1:
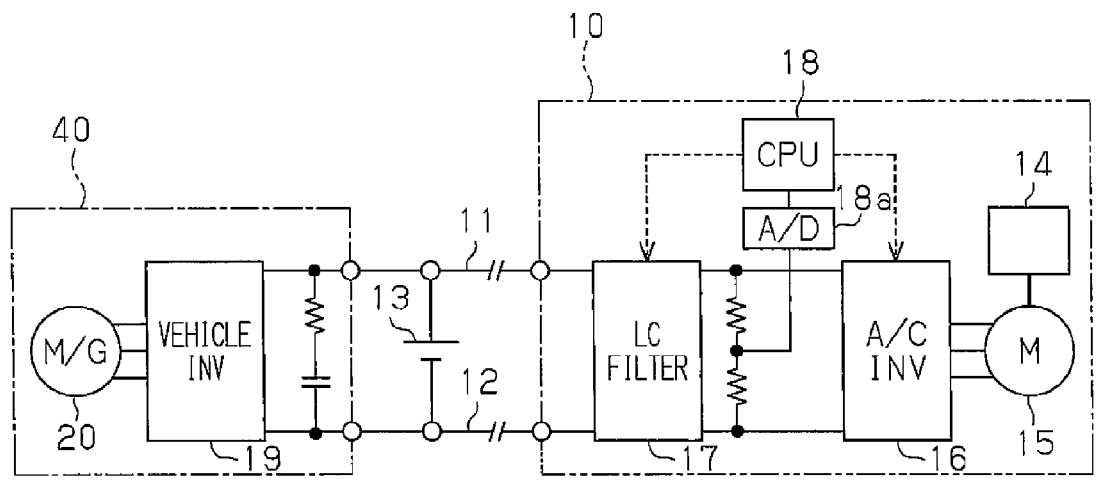
FIG. 1 is a diagram schematically showing an electrical configuration of a vehicle to which a protective device for an LC filter of a first embodiment is applied.

As shown in FIG. 1, a motor-driven compressor 10 as a first vehicle-mounted electric device is connected to a battery 13 as a power supply via a wire 11 on the positive polarity side and a wire 12 on the negative polarity side. The motor-driven compressor 10 includes a compression unit 14, an electric motor 15, an A/C inverter 16, and an LC filter 17. The compression unit 14 compresses a refrigerant for air conditioning. The electric motor 15 drives the compression unit 14. The A/C inverter 16 as a first power converter controls drive power for the electric motor 15. The LC filter 17 removes noise from power supplied from the battery 13 to the A/C inverter 16. The A/C inverter 16 is configured to control the frequency of a carrier (carrier frequency) by PWM (pulse width modulation) to be supplied to a switching element to change the switching pattern of the switching element, thereby changing the frequency of the drive power (drive frequency) for the electric motor 15. The LC filter 17 is composed of a combination of a coil and a capacitor, and functions as a band-pass filter to limit a pass band. The LC filter 17 is configured such that the resonance frequency thereof can be changed, as will be described below.

A central processing unit (CPU) 18 provided in the motor-driven compressor 10 controls the carrier frequency of the A/C inverter 16 and the resonance frequency band of the LC filter 17. A voltage divided between the output terminals of the LC filter 17 is delivered to the CPU 18 via an A/D converter 18a.

Likewise, a traction motor 40 as a second vehicle-mounted electric device is further connected to the battery 13 via the wire 11 on the positive polarity side and the wire 12 on the negative polarity side. The traction motor 40 includes a motor-generator 20 and a vehicle inverter 19. The motor-generator 20 functions as a motor to generate motive power for a vehicle, and a generator to generate regenerative power while the vehicle slows down. The vehicle inverter 19 as a second power converter controls drive power for the motor-generator 20. The carrier frequency of a switching element of the vehicle inverter 19 is controlled by pulse width modulation (PWM) to change the switching pattern of the switching element, thereby changing the drive frequency of the motor-generator 20.

The aforementioned LC filter 17 will be described in detail below.

Figure 2:
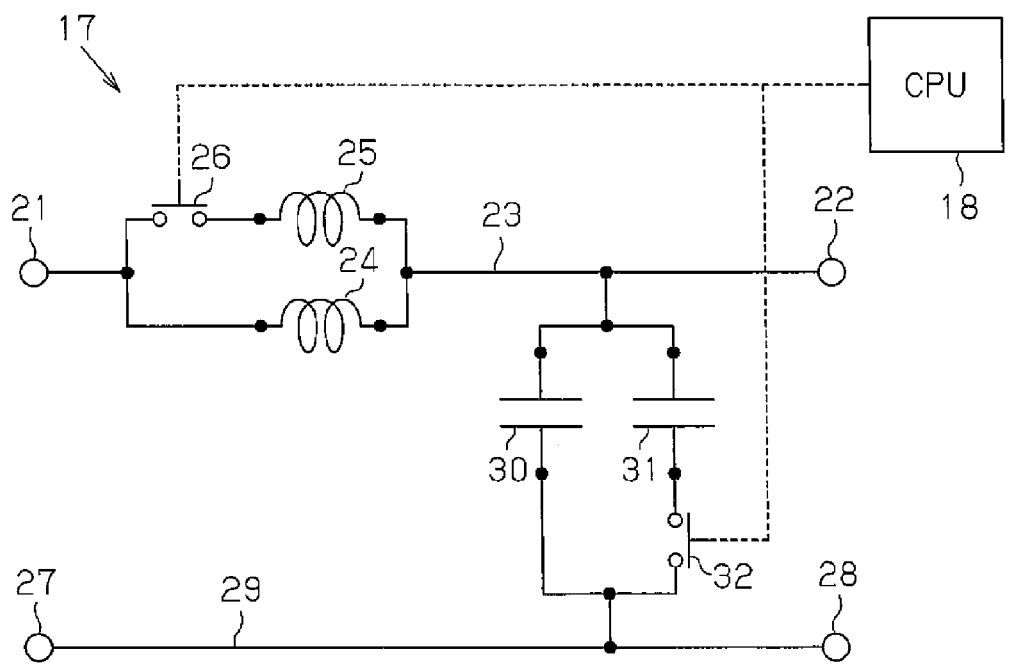
FIG. 2 is a circuit diagram of an LC filter to which the protective device of FIG. 1 is applied.

As shown in FIG. 2, two parallel-connected coils 24 and 25 are provided in a wire 23 on the positive polarity side, which connects an input terminal 21 on the positive polarity side, to an output terminal 22 on the positive polarity side of the LC filter 17. A changeover switch 26 is connected in series with the coil 25. Closing the changeover switch 26 connects the coil 25 with a filter circuit, and opening the changeover switch 26 isolates the coil 25 from the filter circuit.

A wire 29 on the negative polarity side connects an input terminal 27 on the negative polarity side to an output terminal 28 on the negative polarity side of the LC filter 17. The wire 29 on the negative polarity side is connected with the wire 23 on the positive polarity side via two parallel-connected capacitors 30 and 31. A changeover switch 32 is connected in series with the capacitor 31. Closing the changeover switch 32 connects the capacitor 31 with the filter circuit, and opening the changeover switch 32 isolates the capacitor 31 from the filter circuit.

The CPU 18 opens and closes the two changeover switches 26 and 32 of the LC filter 17. If the CPU 18 switches the changeover switches 26 and 32 between an open state and a closed state, the inductance of a coil element and the capacitance of a capacitor element in the LC filter 17 are changed, thereby changing the LC value of the LC filter 17. As a result, the resonance frequency band of the LC filter 17 is changed.

According to the first embodiment of the aforementioned structure, the CPU 18 receives via the A/D converter 18a a voltage divided between the output terminals 22 and 28 of the LC filter 17, and determines a ripple voltage between the output terminals 22 and 28 based on changes in the delivered voltage. The CPU 18 obtains a ripple amount in a current flowing in the LC filter 17 based on the resultant ripple voltage.

Further, the CPU 18 opens or closes the two changeover switches 26 and 32 based on the obtained ripple amount, thereby changing the resonance frequency band of the LC filter 17. This avoids electric resonance in the LC filter 17 due to interference by the carrier frequency of the vehicle inverter 19. In this way, the CPU 18 protects the LC filter 17.

Figure 3:
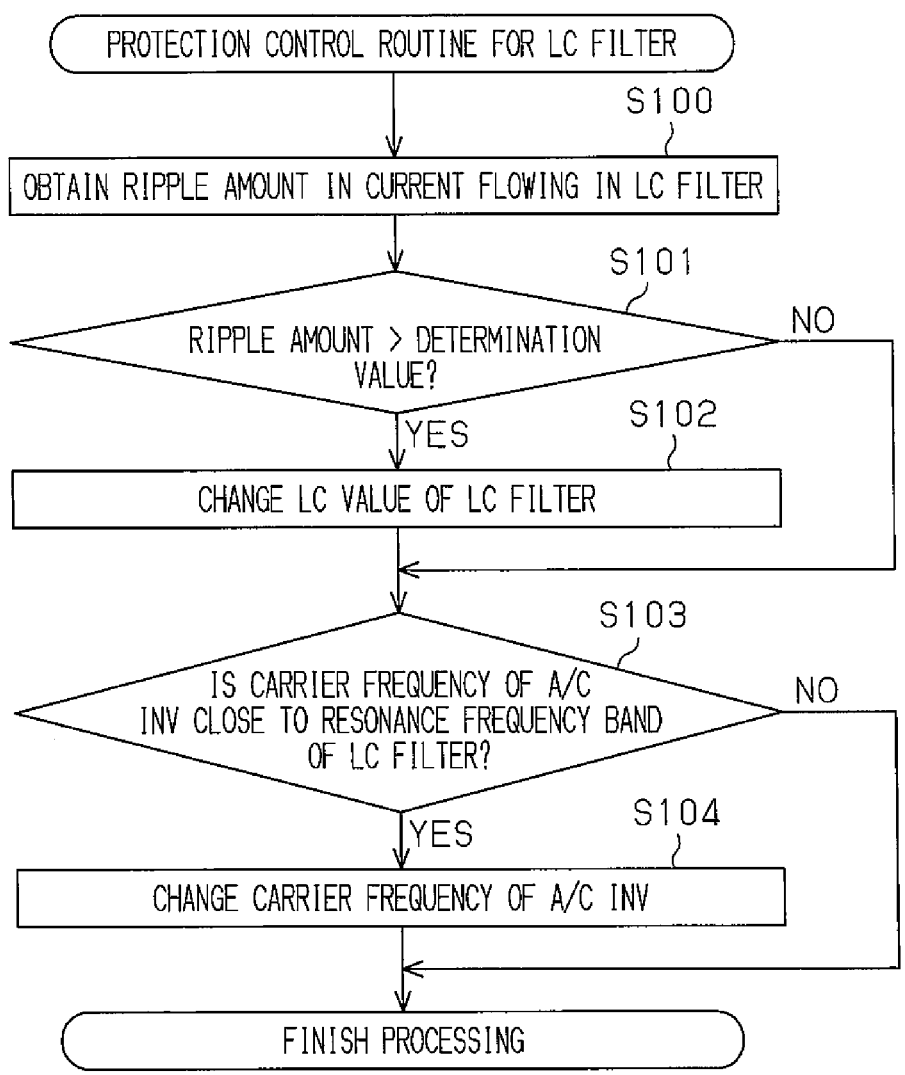
FIG. 3 is a flowchart showing a procedure for a protection control routine employed for the protective device of FIG. 1.

The aforementioned control to protect the LC filter 17 is executed through processing for a protection control routine shown in FIG. 3. The CPU 18 repeatedly performs the processing of the routine at a predetermined control cycle.

When the processing of this routine is started, a ripple amount in a current flowing in the LC filter 17 is obtained first in step S100. In subsequent step S101, it is determined whether the obtained ripple amount is greater than a prescribed determination value (threshold value). The determination value is set at a value slightly smaller than the resistances to current of the capacitors 30 and 31. To be specific, in step S101, it is determined whether a ripple current flowing in the capacitors 30 and 31 has increased to a value close to the withstand current.

If the obtained ripple amount is less than or equal to the determination value (S101: NO), the processing jumps to step S103. In contrast, if the obtained ripple amount is greater than the determination value (S101: YES), the changeover switches 26 and 32 are opened or closed to change the resonance frequency band of the LC filter 17 in step S102. Then, the processing proceeds to step S103.

After the processing proceeds to step S103, it is determined in step S103 whether the carrier frequency of the A/C inverter 16 is close to the resonance frequency band of the LC filter 17. If the carrier frequency of the A/C inverter 16 is not close to the resonance frequency band of the LC filter 17 (S103: NO), the current processing of the routine is finished here. In contrast, if the carrier frequency of the A/C inverter 16 is close to the resonance frequency band of the LC filter 17 (S103: YES), the carrier frequency of the A/C inverter 16 is changed in step S104, and then the current processing of the routine is finished. At this time, the carrier frequency is changed to a value deviating sufficiently from the current value of the resonance frequency band of the LC filter 17. The CPU 18 stores the resonance frequency of the LC filter 17 before change of the LC value and that after the change of an LC value. The aforementioned determination in step S103 is made based on the stored values.

Described next by referring to FIG. 4 is how the protective device for an LC filter of the first embodiment performs control operation during change of the carrier frequency of the vehicle inverter 19. FIG. 4 shows changes in the following elements (a) to (c) before and after change of the carrier frequency of a vehicle inverter in a vehicle that employs the protective device of the first embodiment:

(a) the carrier frequency of the vehicle inverter 19;

(b) a ripple amount in a current flowing in the LC filter 17; and (c) the condition of each of the changeover switches 26 and 32.

Figure 5A:
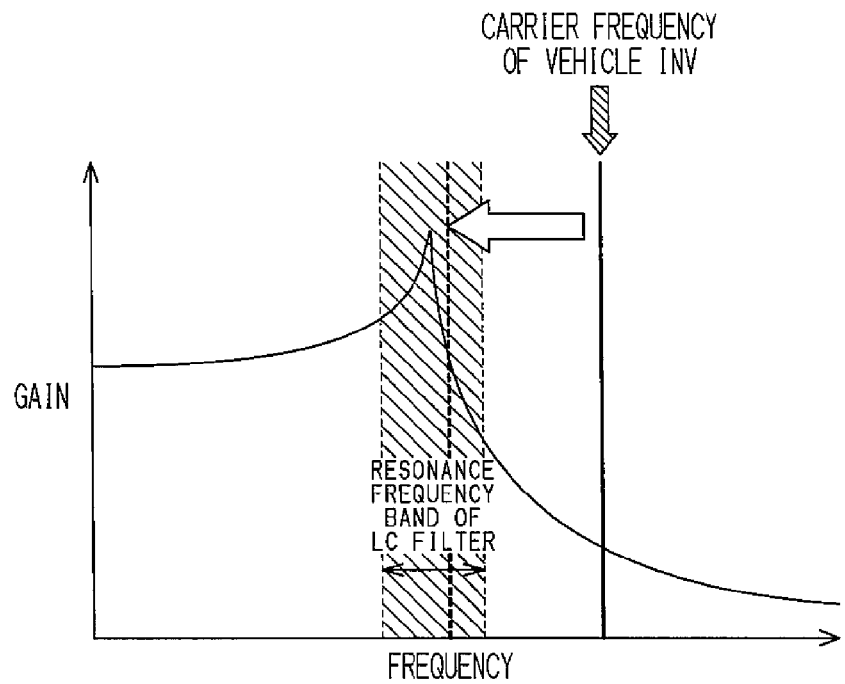
FIG. 5($a$) is a graph showing the gain characteristics of the LC filter before the carrier frequency of the vehicle inverter is changed according to an example of the control by the protective device of FIG. 1.
Figure 5B:
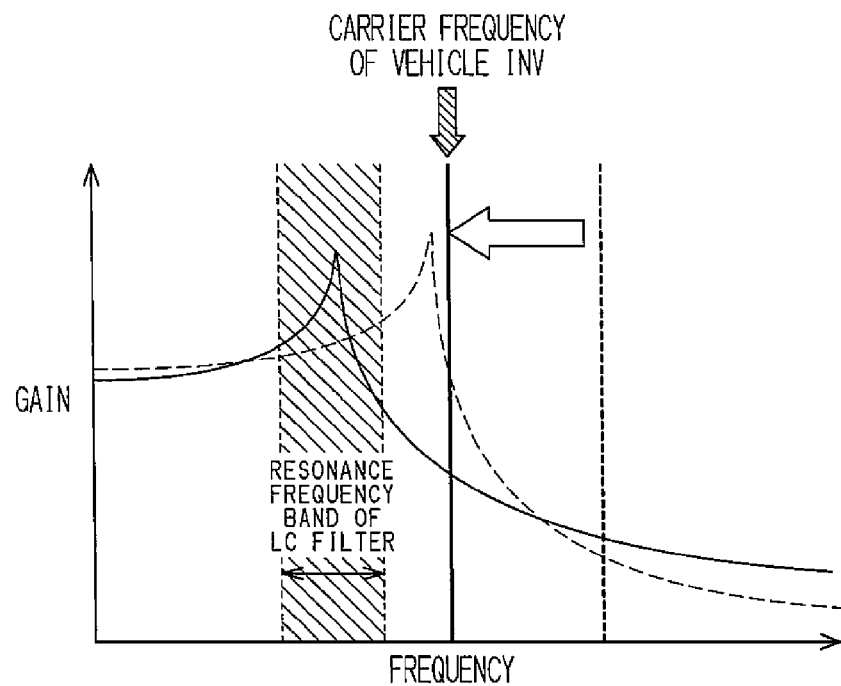

When the carrier frequency of the vehicle inverter 19 is changed at time t1 of FIG. 4 to approach the resonance frequency band of the LC filter 17, a ripple amount in a current flowing in the LC filter 17 increases. When the ripple amount reaches the determination value at time t2 of FIG. 4, the changeover switches 26 and 32 are closed. Then, the resonance frequency band of the LC filter 17 is changed to deviate from the carrier frequency of the vehicle inverter 19. Thus, the ripple amount, increased once after the change of the carrier frequency of the vehicle inverter 19, decreases rapidly thereafter. FIG. 5(a) shows the gain characteristics of the LC filter 17 before the carrier frequency of the vehicle inverter 19 is changed at time t1. FIG. 5(b) shows the gain characteristics of the LC filter 17 after the resonance frequency band is changed at time t2.

Changing the resonance frequency band of the LC filter 17 makes this resonance frequency band approach the carrier frequency of the A/C inverter 16. This develops a risk of electric resonance in the LC filter 17 due to self-interference in the motor-driven compressor 10. In the first embodiment, even if the resonance frequency band of the LC filter 17 approaches the carrier frequency of the A/C inverter 16, the carrier frequency of the A/C inverter 16 is changed to deviate from the resonance frequency band of the LC filter 17.

The first embodiment is configured such that the motor-driven compressor 10 and the traction motor 40 correspond to the first and second vehicle-mounted electric devices, respectively.

The aforementioned protective device for an LC filter of the first embodiment achieves the following advantages.

(1) In the first embodiment, the resonance frequency band of the LC filter 17 is changed based on a ripple amount in a current flowing in the LC filter 17. More specifically, if electric resonance is generated by approach of the carrier frequency of the vehicle inverter 19 to the resonance frequency band of the LC filter 17 to increase a ripple amount in a current flowing in the LC filter 17, the resonance frequency band of the LC filter 17 is changed to deviate from the carrier frequency of the vehicle inverter 19. This avoids generation of the electric resonance in the LC filter 17 due to interference by the carrier of the vehicle inverter 19. Thus, the LC filter 17 can be protected favorably from the increase of a ripple amount due to generation of the electric resonance.

(2) In the first embodiment, the carrier frequency of the A/C inverter 16 is changed if the resonance frequency band of the LC filter 17 approaches the carrier frequency of the A/C inverter 16. This favorably avoids generation of electric resonance in the LC filter 17 due to self-interference in the motor-driven compressor 10.

Second Embodiment

An LC filter according to a second embodiment of the present disclosure will be described by referring to FIG. 6. In the second embodiment and each embodiment described below, structures common to those of the first embodiment are identified by the same reference numbers and will not be described in detail.

In the first embodiment, the resonance frequency band of the LC filter 17 is changed to protect the LC filter 17 from electric resonance due to interference by the carrier of the vehicle inverter 19. In some cases, however, changing the resonance frequency band of the LC filter 17 cannot suppress a ripple amount sufficiently in a current flowing in the LC filter 17 depending on the situation. Thus, in the second embodiment, the equivalent series resistance (ESR) of a capacitor element of the LC filter 17 is changed based on a ripple amount in a current flowing in the LC filter 17, thereby suppressing increase of a ripple current flowing in the capacitors 30 and 31.

Figure 6:
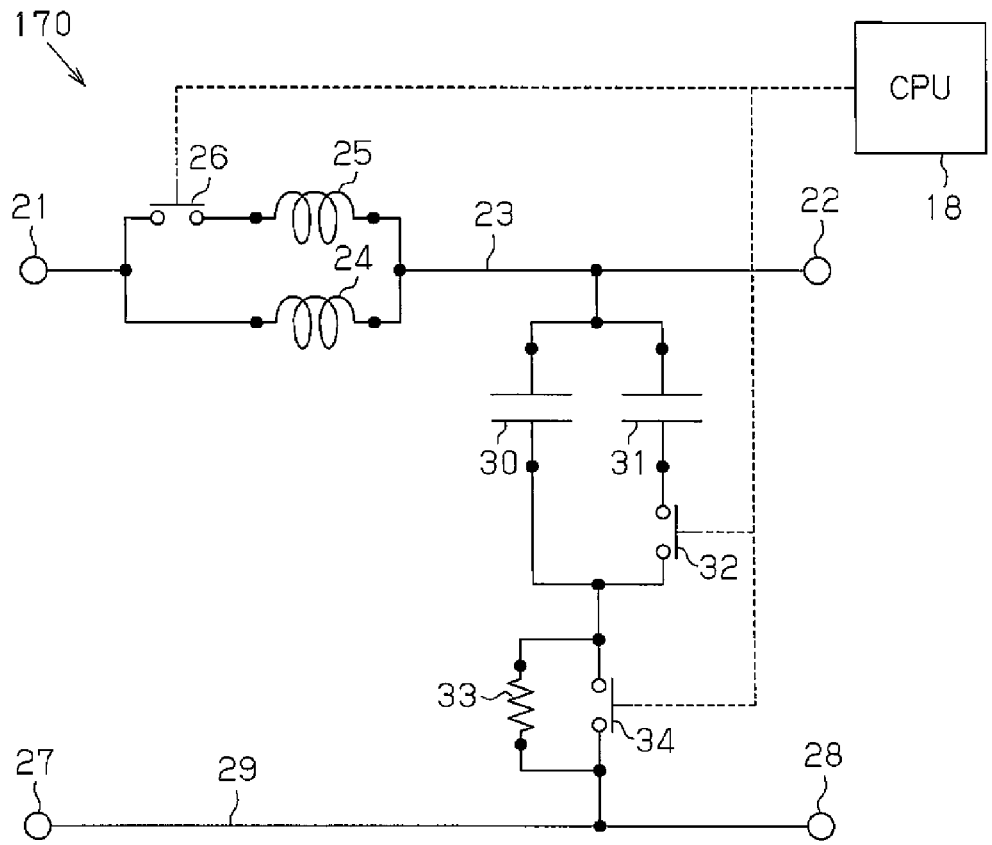
FIG. 6 is a circuit diagram of an LC filter to which a protective device of a second embodiment is applied.

FIG. 6 shows the structure of an LC filter 170 to which a protective device of the second embodiment is applied. The structure of the LC filter 170 is defined by adding an ESR adjusting function to the LC filter 17 (FIG. 2) of the first embodiment. To be specific, the LC filter 170 includes a resistor 33 arranged to be in series with the two parallel-connected capacitors 30 and 31, and a changeover switch 34 arranged in parallel with the resistor 33. Opening the changeover switch 34 connects the resistor 33 in series with the capacitors 30 and 31, thereby increasing the ESRs of the capacitors 30 and 31. Closing the changeover switch 34 directly connects the opposite terminals of the resistor 33. This substantially isolates the resistor 33 from a filter circuit, thereby reducing the ESRs of the capacitors 30 and 31.

Like the changeover switches 26 and 32, the changeover switch 34 for the ESR adjustment is controlled by the CPU 18. The CPU 18 keeps the changeover switch 34 open if a ripple amount in a current flowing in the LC filter 170 is small. If the ripple amount in the LC filter 170 increases, the CPU 18 closes the changeover switches 26 and 32 for change of an LC value and additionally, closes the changeover switch 34 to reduce the ESRs of the capacitors 30 and 31.

In the protective device for an LC filter of the second embodiment, increase of a ripple current flowing in the capacitors 30 and 31 is suppressed both by changing the resonance frequency of the LC filter 170 and by reducing the ESRs of the capacitors 30 and 31. Thus, even if the resonance frequency of the LC filter 170 cannot be changed in a sufficiently wide range so changing the resonance frequency thereof cannot satisfactorily suppress increase of a ripple amount in a current flowing in the LC filter 170, the second embodiment can favorably protect the capacitors 30 and 31.

Third Embodiment

A protective device for an LC filter according to a third embodiment of the present disclosure will be described by referring to FIGS. 7 and 8.

In the aforementioned first embodiment, the CPU 18 changes the resonance frequency of the LC filter 17 based on a ripple amount in a current flowing in the LC filter 17. In contrast, in a protective device of the third embodiment, the CPU 18 changes the resonance frequency band of the LC filter 17 based on carrier frequency information communicated from the side of the motor-generator 20.

Figure 7:
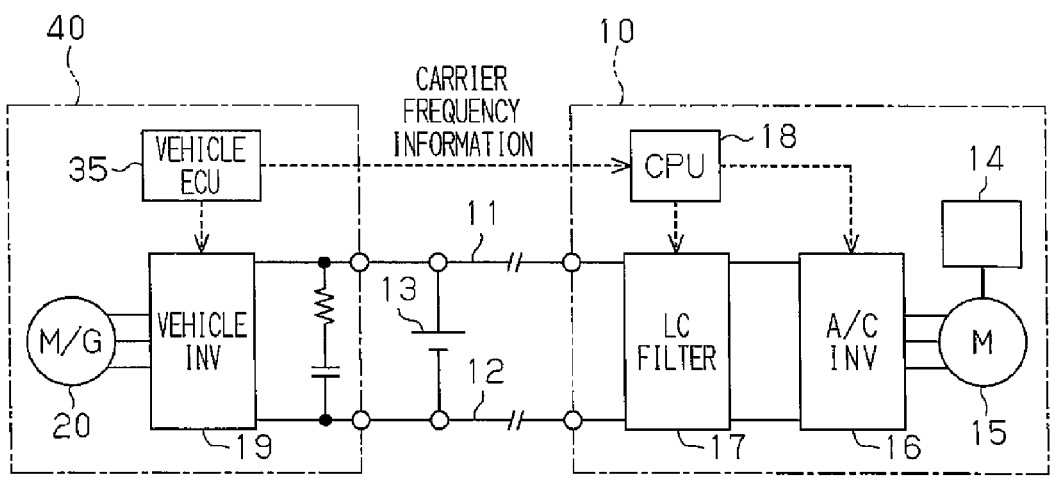
FIG. 7 is a diagram schematically showing an electrical configuration of a vehicle to which a protective device for an LC filter of a third embodiment is applied.

As shown in FIG. 7, the carrier frequency of the vehicle inverter 19, which adjusts drive power for the motor-generator 20, is controlled by a vehicle ECU (electric control unit) 35. The vehicle ECU 35 transmits carrier frequency information about the vehicle inverter 19 to the CPU 18 in the motor-driven compressor 10.

The current value of the carrier frequency of the vehicle inverter 19 may be transmitted as it is as the carrier frequency information, for example. Alternatively, each time the carrier frequency of the vehicle inverter 19 is changed, the amount of the change of the carrier frequency may be transmitted as the carrier frequency information to the CPU 18. In this case, the current value of the carrier frequency of the vehicle inverter 19 can be obtained if an initial value of the carrier frequency of the vehicle inverter 19 is known. Before the carrier frequency of the vehicle inverter 19 is actually changed, a resultant carrier frequency after the change may be transmitted as the carrier frequency information to the CPU 18. Any carrier frequency information is applicable as long as it contains the carrier frequency of the vehicle inverter 19 capable of being obtained by the CPU 18.

Figure 8:
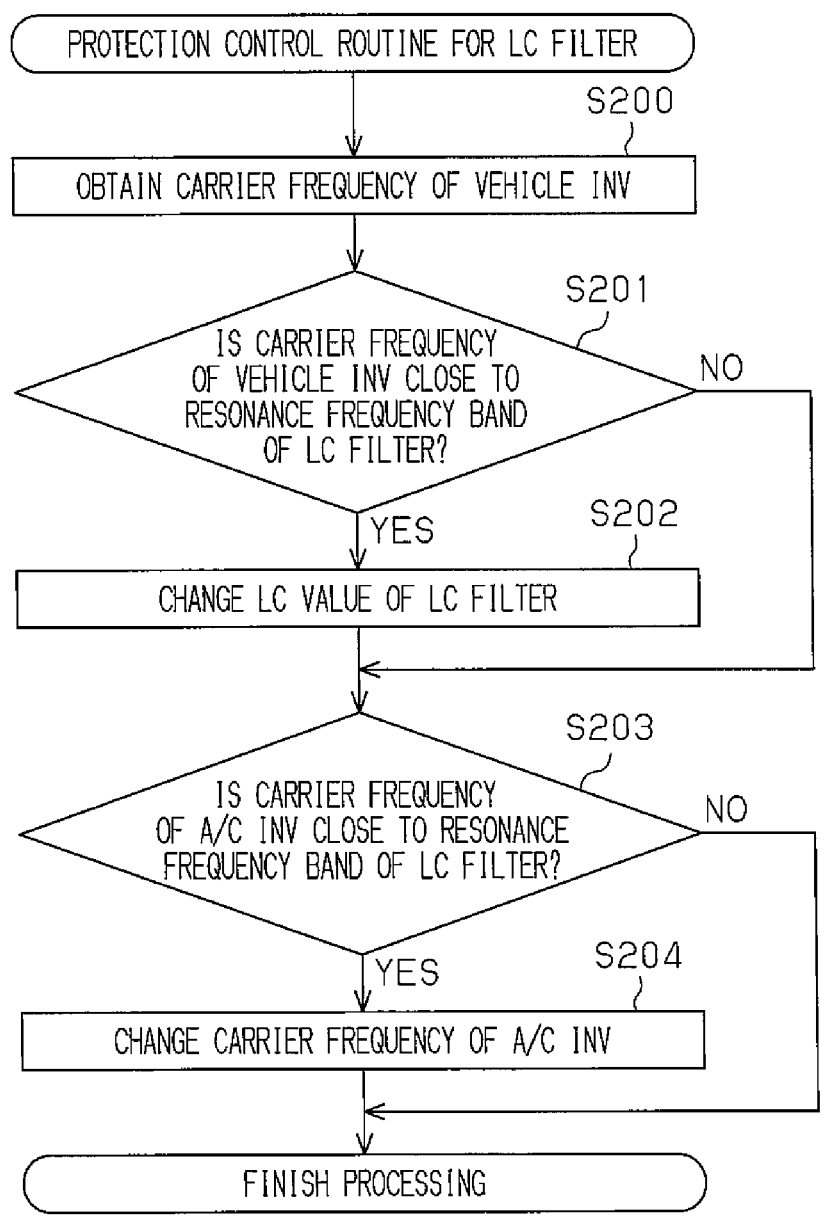
FIG. 8 is a flowchart showing procedure for a protection control routine employed for the protective device of FIG. 7.

In the third embodiment, control to protect the LC filter 17 is executed through processing for a protection control routine shown in FIG. 8. The CPU 18 repeatedly performs the processing of the routine at a predetermined control cycle.

When the processing of this routine is started, the carrier frequency of the vehicle inverter 19 is obtained first in step S200 based on carrier frequency information received from the vehicle ECU 35. In subsequent step S201, it is determined whether the carrier frequency of the vehicle inverter 19 is close to the resonance frequency band of the LC filter 17. If the carrier frequency of the vehicle inverter 19 deviates sufficiently from the resonance frequency band of the LC filter 17 (S201: NO), the processing proceeds to step S203. In contrast, if the carrier frequency of the vehicle inverter 19 is close to the resonance frequency band (S201:

YES), the resonance frequency band of the LC filter 17 is changed in step S202. Then, the processing proceeds to step S203.

After the processing proceeds to step S203, it is determined in step S203 whether the carrier frequency of the A/C inverter 16 is close to the resonance frequency band of the LC filter 17. If the carrier frequency of the A/C inverter 16 deviates sufficiently from the resonance frequency band of the LC filter 17 (S203: NO), the current processing of the routine is finished here. In contrast, if the carrier frequency of the A/C inverter 16 is close to the resonance frequency band of the LC filter 17 (S203: YES), the carrier frequency of the A/C inverter 16 is changed in step S204, and then the current processing of the routine is finished. At this time, the carrier frequency is changed to a value deviating sufficiently from the current value of the resonance frequency band of the LC filter 17.

In the protective device for an LC filter of the third embodiment, if the carrier frequency of the vehicle inverter 19 approaches the resonance frequency band of the LC filter 17 to increase a ripple amount in a current flowing in the LC filter 17, the resonance frequency band of the LC filter 17 is also changed to deviate from the carrier frequency of the vehicle inverter 19. If this change makes the resonance frequency band of the LC filter 17 approach the carrier frequency of the A/C inverter 16, the carrier frequency of the A/C inverter 16 is changed to deviate from the resonance frequency band of the LC filter 17. In this way, the protective device for an LC filter of the third embodiment also achieves the aforementioned advantages (1) and (2).

If the LC filter 170 of the second embodiment having the ESR adjusting function is employed, an ESR can be changed based on carrier frequency information received from the vehicle ECU 35.

Each of the aforementioned embodiments may be modified as follows.

In the first embodiment, a ripple voltage between the output terminals of the LC filter 17 is measured to obtain a ripple amount in a current flowing in the LC filter 17. This ripple amount may be obtained in a different way.

In the aforementioned embodiments, one of the two parallel-connected coils 24 and 25 (coil 25) is connected to or isolated from the filter circuit by closing or opening the changeover switch 26, thereby changing the inductance of a coil element of the LC filter 17 or 170. The inductance may be changed in a different way. As an example, two coils are connected in series, a changeover switch is connected in parallel with one of these coils, and this changeover switch is closed to short-circuit the opposite terminals of this coil. This can also change the inductance of a coil element of the LC filter 17 or 170.

In the aforementioned embodiments, one of the two parallel-connected capacitors 30 and 31 (capacitor 31) is connected to or isolated from the filter circuit by closing or opening the changeover switch 32, thereby changing the capacitance of a capacitor element of the LC filter 17 or 170. The capacitance may be changed in a different way. As an example, two capacitors are connected in series, a changeover switch is connected in parallel with one of these capacitors, and this changeover switch is closed to short-circuit the opposite terminals of this capacitor. This can also change the capacitance of a capacitor element of the LC filter 17 or 170.

In the aforementioned embodiments, the resonance frequency band of the LC filter 17 or 170 is changed both by changing the capacitance of a capacitor element and the inductance of a coil element of this LC filter. The resonance frequency band of the LC filter 17 or 170 may also be changed by changing either the capacitance or the inductance.

In the aforementioned embodiments, the carrier frequency of the A/C inverter 16 may be changed based on a ripple amount in a current flowing in the LC filter 17 or 170. It is probable that a ripple amount is not reduced even if electric resonance due to interference by the carrier frequency of the vehicle inverter 19 is avoided by changing the resonance frequency of the LC filter 17 or 170. In this case, electric resonance due to interference by the carrier frequency of the A/C inverter 16 is generated. Hence, configuring the embodiments of this disclosure to change the carrier frequency of the A/C inverter 16 in response to a ripple amount having reached a fixed value or more can favorably avoid generation of electric resonance in the LC filter 17 due to self-interference in the motor-driven compressor 10 to occur as a result of change of the resonance frequency band of the LC filter 17.

If the carrier frequency of the A/C inverter 16 keeps deviating sufficiently from the resonance frequency band of the LC filter 17 or 170 after change of this resonance frequency band, the embodiments of this disclosure may be configured such that the carrier frequency of the A/C inverter 16 will not be changed.

The resonance frequency band of the LC filter 17 or 170, an ESR, and the carrier frequency of the A/C inverter 16 may be changed in multiple steps.

The aforementioned embodiments are intended to protect the LC filter 17 from electric resonance to be generated due to interference by the carrier of the vehicle inverter 19 in the traction motor 40 for a vehicle. If there is a vehicle-mounted electric device different from the traction motor 40 and if this vehicle-mounted electric device shares a power supply with the motor-driven compressor 10 and includes a power converter to output a carrier that may generate electric resonance in the LC filter 17, the protective device of this disclosure may also be configured to protect the LC filter 17 from electric resonance due to interference by the carrier of the power converter of this different vehicle-mounted electric device. The power converter of such a vehicle-mounted electric device may be a power converter capable of changing the voltage or frequency of an output voltage by the frequency of a carrier such as a DC-DC converter or a booster circuit different from an inverter.

In the aforementioned embodiments, this disclosure is embodied as the protective device for the LC filter 17 in the motor-driven compressor 10. This is not the only example of the embodiment, but this disclosure can also be embodied as a protective device for an LC filter in a vehicle-mounted electric device different from the motor-driven compressor 10.

The invention claimed is:

1. A protective device configured to protect an LC filter in a vehicle, wherein
    the vehicle includes a first vehicle-mounted electric device and a second vehicle-mounted electric device,
    the first vehicle-mounted electric device includes a first power converter,
    the second vehicle-mounted electric device includes a second power converter and shares a power supply with the first vehicle-mounted electric device,
    the LC filter is arranged between the first power converter and the power supply,
    the protective device comprising:
    a central processing unit (CPU) configured with executable program logic, to perform:

obtaining a ripple amount in current flowing in the LC filter;

determining whether or not the ripple amount in the current flowing in the LC filter is more than a predetermined threshold, the predetermined threshold being based on a withstand current of a capacitor element of the LC filter;

based upon the ripple amount being more than the predetermined threshold, changing a resonance frequency band of the LC filter, wherein the resonance frequency band of the LC filter is changed so that a difference between the resonance frequency band of the LC filter and a carrier frequency of the second power converter becomes greater than before the resonance frequency band of the LC filter is changed.

2. The protective device for an LC filter according to claim 1, wherein the CPU is configured to change a carrier frequency of the first power converter in the first vehicle-mounted electric device based on the ripple amount.

3. The protective device for an LC filter according to claim 1, wherein the CPU is configured to change an equivalent series resistance of the capacitor element of the LC filter based on the ripple amount.

4. The protective device for an LC filter according to claim 1, wherein the CPU is configured to change the resonance frequency band by changing at least one of a capacitance of the capacitor element of the LC filter and an inductance of a coil element of the LC filter.

5. The protective device for an LC filter according to claim 1, wherein the CPU is configured to change a carrier frequency of the first power converter in the first vehicle-mounted electric device if the resonance frequency band of the LC filter is changed based on the ripple amount and the resonance frequency band of the LC filter after the change is close to the carrier frequency of the first power converter.

6. The protective device for an LC filter according to claim 1, wherein the first vehicle-mounted electric device is a motor-driven compressor and the second vehicle-mounted electric device is a traction motor.

7. A vehicle-mounted electric device as a first vehicle-mounted electric device mounted on a vehicle, the first vehicle-mounted electric device comprising:

a first power converter;

an LC filter arranged between a power supply and the first power converter; and a protective device that protects the LC filter, wherein the vehicle includes a second vehicle-mounted electric device in which a second power converter is provided, the first vehicle-mounted electric device shares the power supply with the second vehicle-mounted electric device, and the protective device comprising a central processing unit (CPU) configured with executable program logic, to obtain a ripple amount in current flowing in the LC filter, to determine whether or not the ripple amount in the current flowing in the LC filter is more than a predetermined threshold, the predetermined threshold being based on a withstand current of a capacitor element of the LC filter, and, based upon the ripple amount being more than the predetermined threshold, to change a resonance frequency band of the LC filter wherein the resonance frequency band of the LC filter is changed so that a difference between the resonance frequency band of the LC filter and a carrier frequency of the second power converter becomes greater than before the resonance frequency band of the LC filter is changed.

8. The vehicle-mounted electric device according to claim 7, wherein the LC filter includes two parallel-connected coils provided in a first wire on a positive polarity side, two parallel-connected capacitors provided in a second wire on a negative polarity side, a first changeover switch connected in series with one of the coils, and a second changeover switch connected in series with one of the capacitors, and the CPU further configured to selectively open and close the first and second changeover switches thereby changing the resonance frequency band of the LC filter.

* * * * *